(12) United States Patent
Cahill (10) Patent No.: US 6,222,413 B1
(45) Date of Patent: Apr. 24, 2001

(54) RECEIVER ASSISTED NET DRIVER CIRCUIT

(75) Inventor: Joseph James Cahill, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/270,031

(22) Filed: Mar. 16, 1999

(51) Int. Cl.$^7$ ........................................ H03K 17/00
(52) U.S. Cl. ................................ 327/365; 326/56
(58) Field of Search ........................... 327/108, 365, 327/374, 379, 520; 326/21, 22, 31, 35, 56, 57, 58

(56) References Cited

U.S. PATENT DOCUMENTS

| | | | |
|---|---|---|---|
| 4,703,198 | * 10/1987 | Porter et al. | 326/86 |
| 4,774,422 | * 9/1988 | Donaldson et al. | 326/86 |
| 4,829,515 | * 5/1989 | Donaldson et al. | 370/85 |
| 4,835,418 | * 5/1989 | Hsieh | 326/57 |
| 4,961,010 | 10/1990 | Davis | 326/27 |
| 4,987,319 | * 1/1991 | Kawana | 326/37 |
| 5,036,222 | 7/1991 | Davis | 326/27 |
| 5,202,593 | * 4/1993 | Huang et al. | 326/86 |
| 5,227,677 | 7/1993 | Furman | 326/21 |
| 5,414,312 | * 5/1995 | Wong | 326/83 |
| 5,430,391 | * 7/1995 | Fujimoto et al. | 326/57 |
| 5,498,976 | * 3/1996 | Hwang | 326/30 |
| 5,500,611 | * 3/1996 | Popat et al. | 326/87 |
| 5,661,416 | * 8/1997 | Takada et al. | 326/86 |
| 5,867,037 | * 2/1999 | Capps, Jr. et al. | 326/38 |

OTHER PUBLICATIONS

"All The Right Moves", A VLSI Architecture for Chess, ACM Distinguished Dissertations, by Carl Ebeling, 1987, pp. 114–115.

* cited by examiner

Primary Examiner—Timothy P. Callahan
Assistant Examiner—Hai L. Nguyen
(74) Attorney, Agent, or Firm—Joan Pennington

(57) ABSTRACT

An improved net driver circuit is provided. The net driver circuit includes a control circuit. A bi-directional input/output (I/O) circuit is coupled to the control circuit. The bi-directional input/output (I/O) circuit includes a receiver and a driver. The control circuit monitors the net and responsive to a new changed state of the net being identified, the control circuit enables the driver to drive the net to the new changed state. The receiver senses the current state of the net and the control circuit remembers the previous state of the net. When the net state is the same as the previous state, the control circuit causes the driver to be in a high impedance state.

11 Claims, 13 Drawing Sheets

TRUTH TABLE LOGIC BLOCK 300

| AND 302 INPUTS | AND 302 OUTPUT | AND 304 INPUTS | AND 304 OUTPUT | NOR 306 INPUTS | NOR 306 OUTPUT |
|---|---|---|---|---|---|
| 00 | 0 | 00 | 0 | 00 | 1 |
| 10 | 0 | 00 | 0 | 00 | 1 |
| 01 | 0 | 00 | 0 | 01 | 1 |
| 11 | 1 | 00 | 0 | 10 | 0 |
| 00 | 0 | 01 | 0 | 00 | 1 |
| 00 | 0 | 10 | 0 | 00 | 1 |
| 00 | 0 | 01 | 0 | 00 | 1 |
| 00 | 0 | 11 | 1 | 01 | 0 |
| 11 | 1 | 11 | 1 | 11 | 0 |

FIG. 7

TRUTH TABLE TRANSITION ASSIST LOGIC 200
DRIVE MODE

| DATA | ENABLE | NREC_OUT | TA_IN | TRANSITION | NREC_OUT_NOT | BIDI_DATA | BIDI_ENABLE |
|---|---|---|---|---|---|---|---|
| 0 | 1 | x | x | x | $\overline{\text{NREC\_OUT}}$ | 0 | 1 |
| 1 | 1 | x | x | x | $\overline{\text{NREC\_OUT}}$ | 1 | 1 |

FIG. 8A

TRUTH TABLE TRANSITION ASSIST LOGIC 200
RECEIVE MODE

| DATA | ENABLE | NREC_OUT | TA_IN | TRANSITION | NREC_OUT_NOT | BIDI_DATA | BIDI_ENABLE |
|------|--------|----------|-------|------------|--------------|-----------|-------------|
| X    | 0      | 0        | 1     | X          | 1            | (1) $\overline{\text{NREC\_OUT}}$ | 0 |
| X    | 0      | 1        | 1     | X          | 0            | (0) $\overline{\text{NREC\_OUT}}$ | 0 |

FIG. 8B

TRUTH TABLE TRANSITION ASSIST LOGIC 200
TRANSITION ASSIST MODE

| DATA | ENABLE | NREC_OUT | TA_IN | TRANSITION | NREC_OUT_NOT | BIDI_DATA | BIDI_ENABLE |
|---|---|---|---|---|---|---|---|
| X | 0 | 0 | 0 | ? | 1 | (1) $\overline{\text{NREC\_OUT}}$ | ? |
| X | 0 | 1 | 0 | ? | 0 | (0) $\overline{\text{NREC\_OUT}}$ | ? |
| X | 0 | ? | 0 | 0 | ? | ? | 0 |
| X | 0 | ? | 0 | 1 | ? | ? | 1 |

FIG. 8C

RECEIVER ASSISTED NET DRIVER CIRCUIT

FIELD OF THE INVENTION

The present invention relates to integrated circuit chips and to integrated circuit devices, and more particularly, relates to a receiver assisted net driver circuit.

DESCRIPTION OF THE RELATED ART

As used in the following description and claims, the term net means a connection or wire between a number of integrated circuit chips or between transistors in a circuit.

Chip-to-chip nets that are unterminated, multi-drop and long as compared to the transition time of the driving chip are difficult to switch fast. When the driver transition rate and the driver output impedance are selected to switch the net quickly, a lot of energy is left in the net after all of the receiving nodes have crossed the switching threshold. This remnant energy must dissipate in the driver; otherwise the remnant energy will disturb subsequent data transitions.

A need exists for an improved net driver circuit. It is desirable to provide such net drive circuit that enables faster transitions. It is desirable to provide such net drive circuit that effectively dissipates switching energy after all of the receiving nodes have switched. It is desirable to provide such net drive circuit that minimizes noise for the transitions.

SUMMARY OF THE INVENTION

A principal object of the present invention is to provide an improved net driver circuit. Other objects are to provide such net driver circuit substantially without negative effects and that overcomes many of the disadvantages of prior art arrangements.

In brief, an improved net driver circuit is provided. The net driver circuit includes a control circuit. A bidirectional input/output (I/O) circuit is coupled to the control circuit. The bidirectional input/output (I/O) circuit includes a receiver and a driver. The control circuit monitors the net and responsive to a new changed state of the net being identified, the control circuit enables the driver to drive the net to the new changed state.

In accordance with features of the invention, the receiver senses the current state of the net and the control circuit remembers the previous state of the net. When the net state is the same as the previous state, the control circuit causes the driver to be in a high impedance state.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
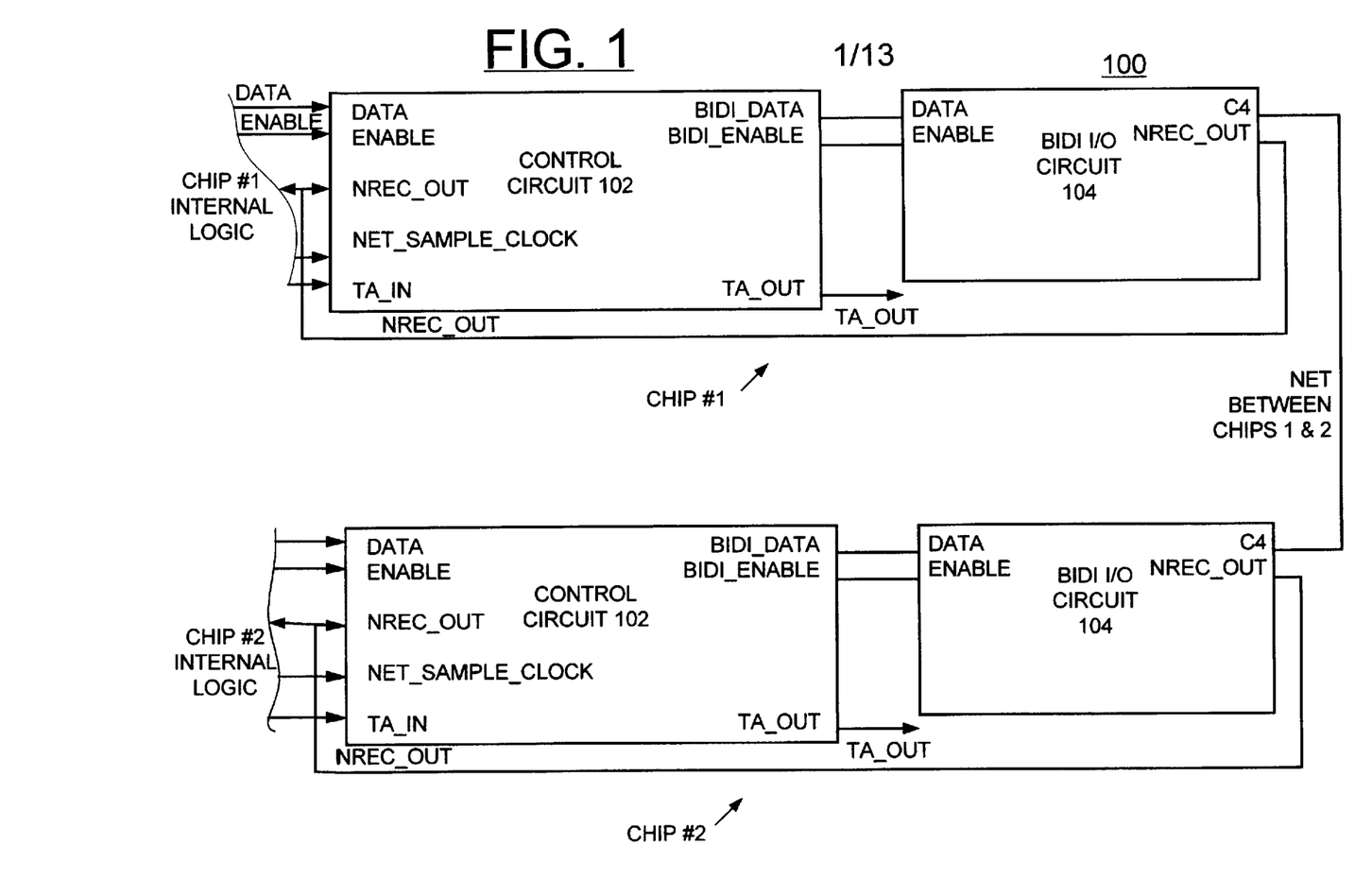
FIG. 1 is a schematic and block diagram representation of a receiver assisted net driver circuit of the preferred embodiment.
Figure 9A:
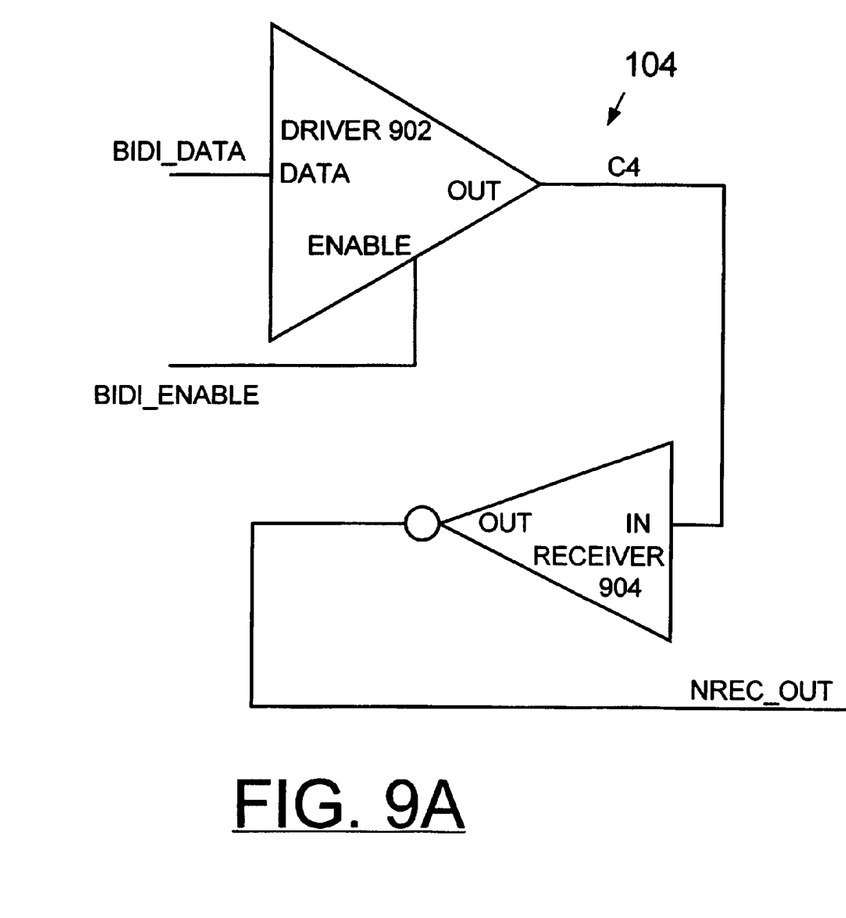
FIG. 9A is a schematic diagram for a bi-directional input/output (I/O) circuit of the receiver assisted net driver circuit of FIG. 1.

Having reference now to the drawings, in FIG. 1, there is shown a receiver assisted net driver circuit of the preferred embodiment generally designated by the reference character 100. Receiver assisted net driver circuit 100 includes a control circuit 102 interconnected with a bi-directional input/output I/O circuit 104. Control circuit 102 receives control signals from on-chip logic. FIG. 9 illustrates the bi-directional input/output I/O circuit 104. As shown, bi-directional input/output I/O circuit 104 includes a combination of a driver 902 and a receiver 904. Control circuit 102 is connected to the input of the driver 902 of the bi-directional input/output I/O circuit 104, so that the driver 902 assists to speed up incoming transitions. Control circuit 102 receives the NREC_OUT signal from receiver 904. DATA, ENABLE, TA_IN signals and an optional net sample clock are applied to the control circuit 102. The TA_IN signal is used to enable a transition assist function of the preferred embodiment of the control circuit 102. BIDI_DATA, BIDI_ENABLE, and TA_OUT signals provided by the control circuit 102 are applied to the bi-directional input/output I/O circuit 104.

Figure 2:
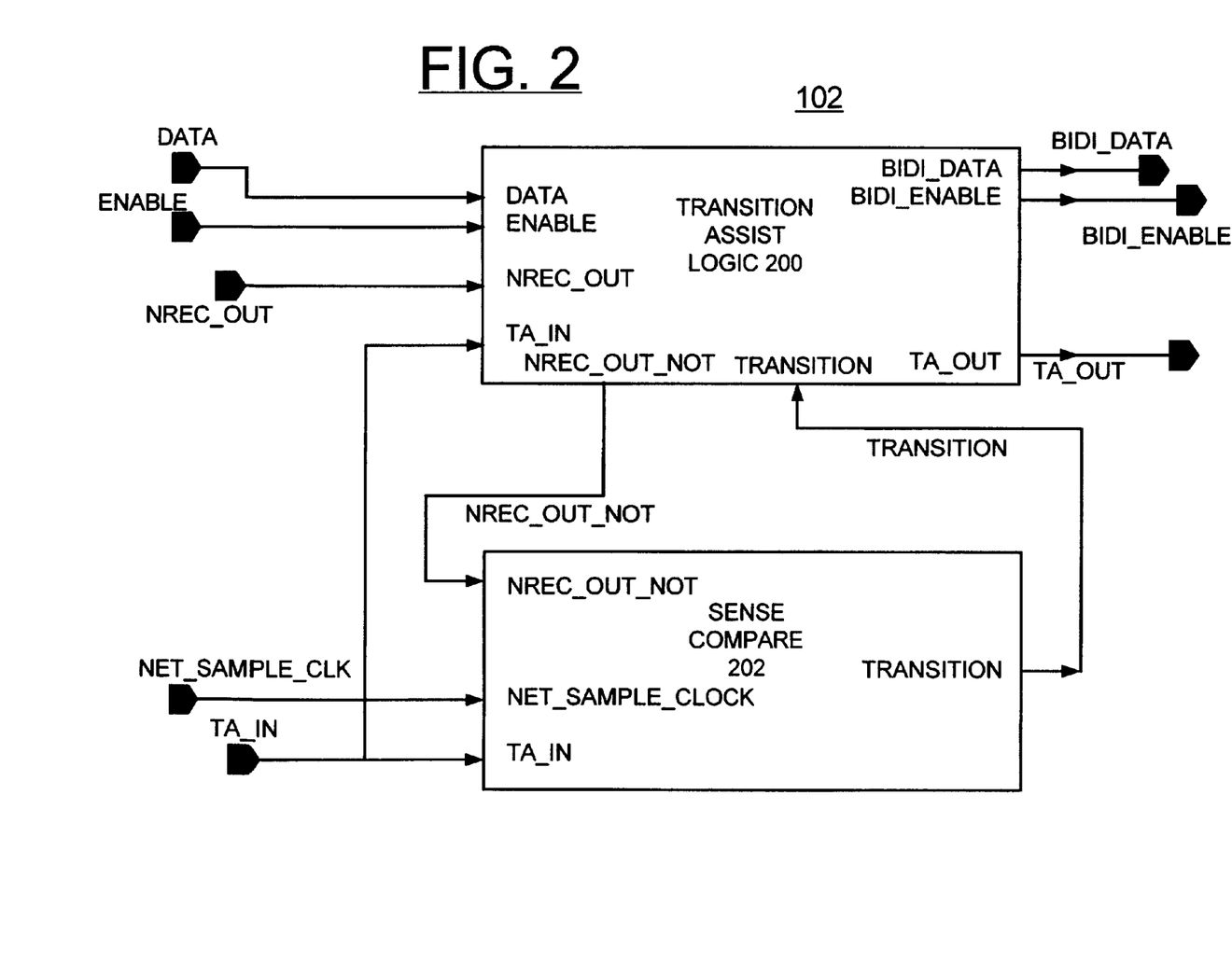
FIG. 2 is a schematic and block diagram representation of a control circuit of the preferred embodiment of the receiver assisted net driver circuit of FIG. 1.
Figure 3:
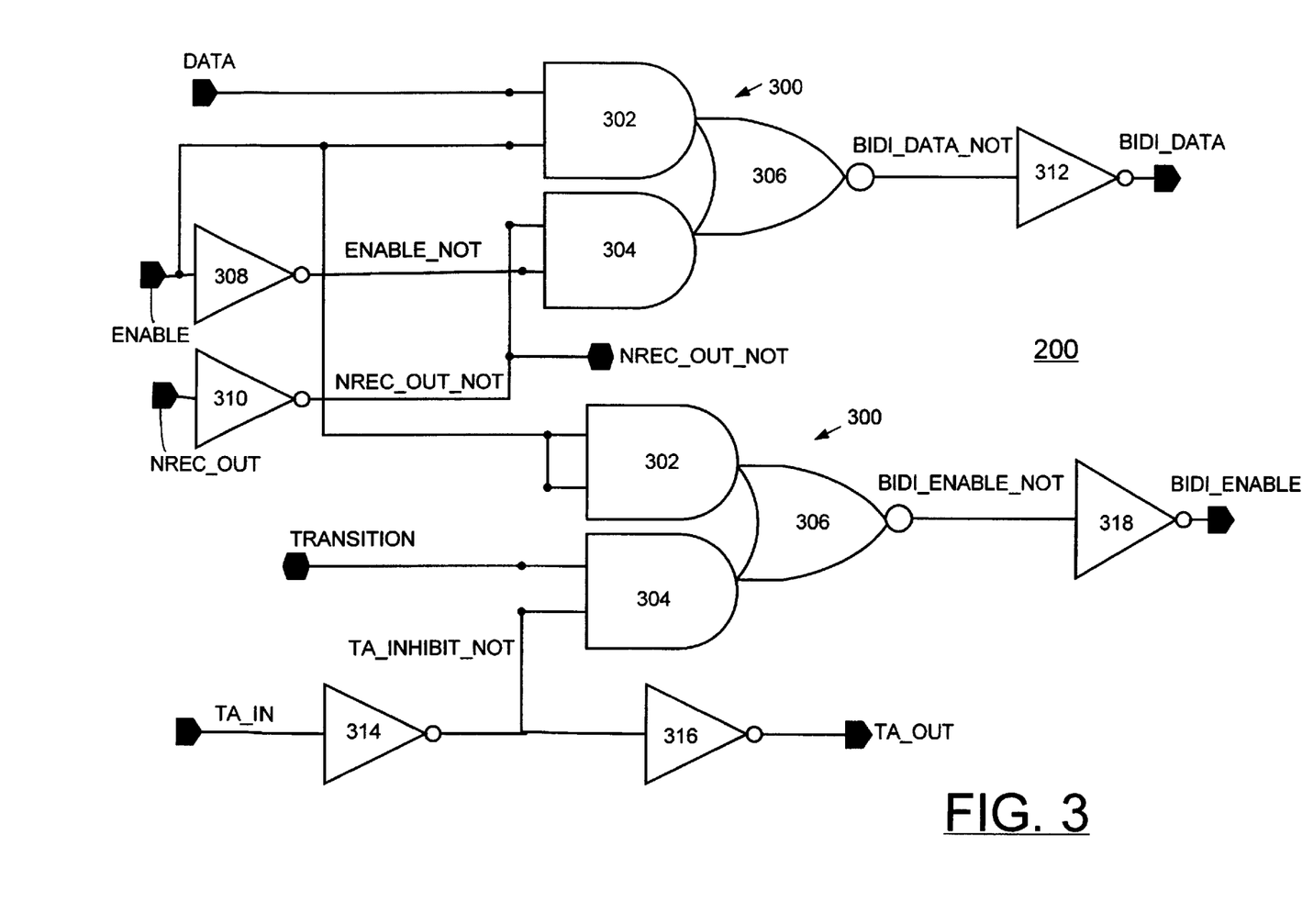
FIG. 3 is a schematic and block diagram representation of a transition assist logic circuit of the preferred embodiment of the control circuit of FIG. 2.
Figure 4:
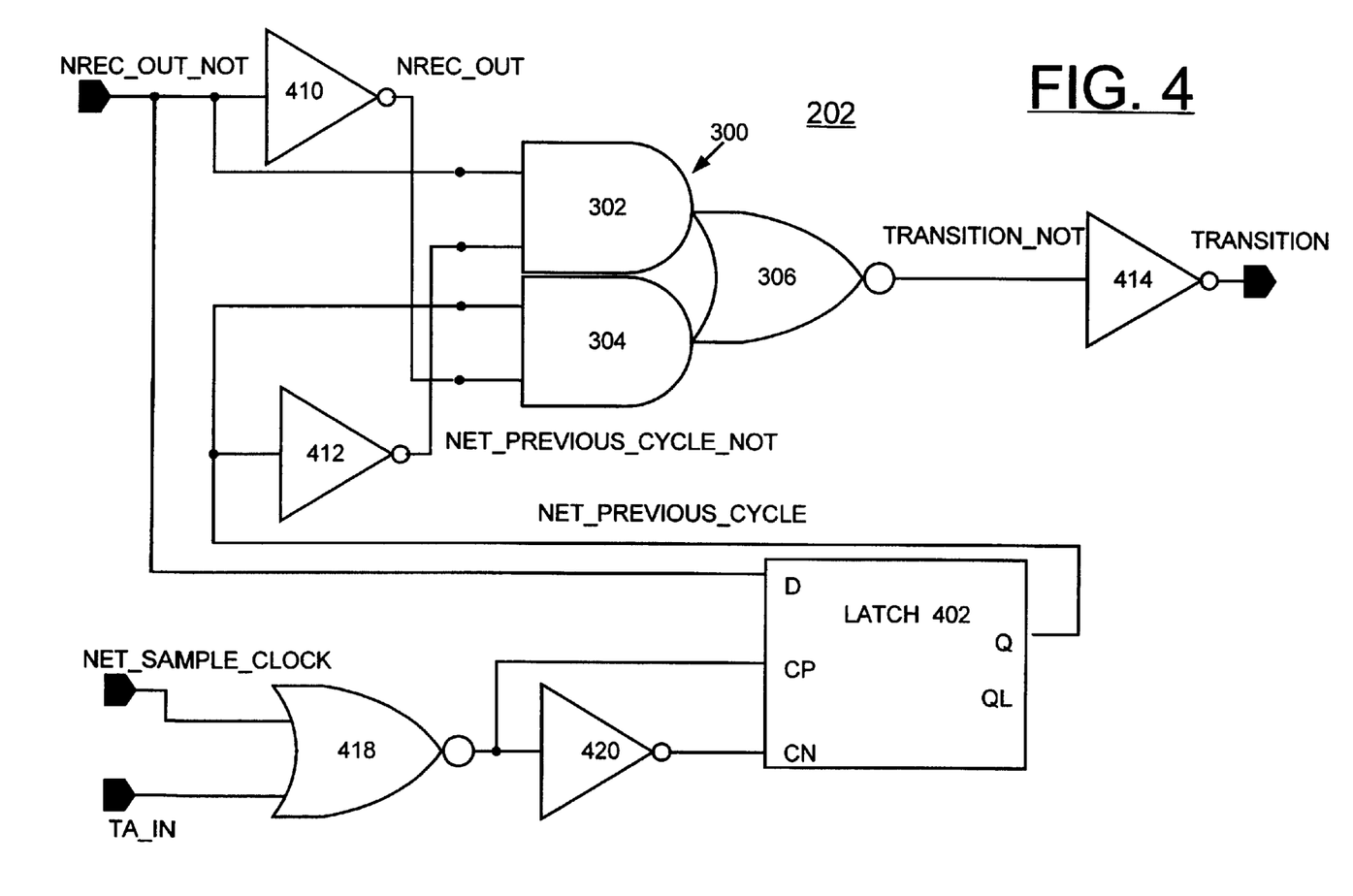
FIG. 4 is a schematic and block diagram representation of a sense compare circuit of the preferred embodiment of the control circuit of FIG. 2.

Control circuit 102 illustrated in FIGS. 2, 3 and 4 is clocked and uses a latch to store the state of the net for the previous state. An alternative control circuit 102A illustrated in FIGS. 5 and 6, includes a time delay RC to store the state of the net for the previous state.

In accordance with features of the invention, a receiver portion of the bi-directional input/output I/O circuit 104, control circuit 102 and the driver portion of the bi-directional input/output I/O circuit 104 are used to assist the switching transition of the net at each receiving chip. Inactive drivers at the receiving chips are used to help the net switch faster, and to help dissipate the switching energy after all of the receiving nodes have switched. Normally a chip sets the driver portion of its I/O bi-directional circuit to the high impedance state when it is receiving data from the net, and sets the driver portion to either drive low or drive high when it is sending data on the net.

In accordance with features of the invention, a receiver of the bi-directional input/output I/O circuit 104 senses the current state of the net and the control circuit 102 or 102A remembers the previous state of the net. When the chip 100 is receiving, and this function is enabled by the control signal TA_IN, the control circuit 102 or 102A monitors the net. When it senses that the net has a new state that is different from the old state, control circuit 102 or 102A cause the driver 902 to drive the net to the new state of the net. When the net state is the same as the old state, the control circuit 102 or 102A causes the driver 902 to be in the high impedance state.

Previous solutions have not controlled the assisting circuit to force it to be at a high impedance state before and during the net transition. The assisting circuit was always active and it was necessary to overdrive the current state of the assisting circuit to initiate the net transition while the assisting circuit held the net at the old state. In accordance with the preferred embodiment, control circuit 102 or 102A does not hold the net at the old state. Once the transition is completed the assisting circuit releases the net, and does not need to be overdriven like the other implementations.

Referring to FIGS. 2, 3, and 4 control circuit 102 includes a transition assist logic 200 and a sense compare circuit 202 that uses a clock and a latch to store the state of the net as the previous state. Transition assist logic 200 shown in more detail in FIG. 3 includes a pair of logic blocks 300 formed by a pair of two input AND gates 302 and 304 connected at the output to a two input NOR gate 306. Transition assist logic 200 includes a plurality of inverters 308, 310, 312, 314, 316, and 318. ENABLE and DATA inputs are applied to AND gate 302 of a first logic block 300. Inverter 308 receives the ENABLE input and provides an ENABLE_NOT output. Inverter 310 receives the NEC_OUT input and provides an NEC_OUT_NOT output. ENABLE_NOT and NEC_OUT_NOT inputs are applied to AND gate 304 of the first logic block 300. As shown in a truth table for the logic block 300 in FIG. 7, the output (BIDI_DATA_NOT) of NOR gate 306 of the first logic block 300 is high unless either both ENABLE and DATA inputs to AND gate 302 are one or ENABLE_NOT and NEC_OUT_NOT inputs to AND gate 304 are one. The BIDI_DATA_NOT output of NOR gate 306 is inverted by inverter 312 providing the BIDI_DATA output of the transition assist logic 200.

In the transition assist logic 200, the ENABLE signal is applied to both inputs of AND gate 302 of a second logic block 300. The transition signal from the sense compare circuit 102 is applied to a first input of AND gate 304 of the second logic block 300. The TA_IN control signal is inverted by inverter 314. The TA_IN_NOT output of inverter 314 is applied to the second input of AND gate 304 of the second logic block 300. The TA_IN_NOT output of inverter 314 is applied to inverter 316 providing output TA_OUT. The output (BIDI_ENABLE_NOT) of NOR gate 306 of the second logic block 300 is inverted by inverter 318 providing the BIDI_ENABLE output of the transition assist logic 200.

Figure 8A:
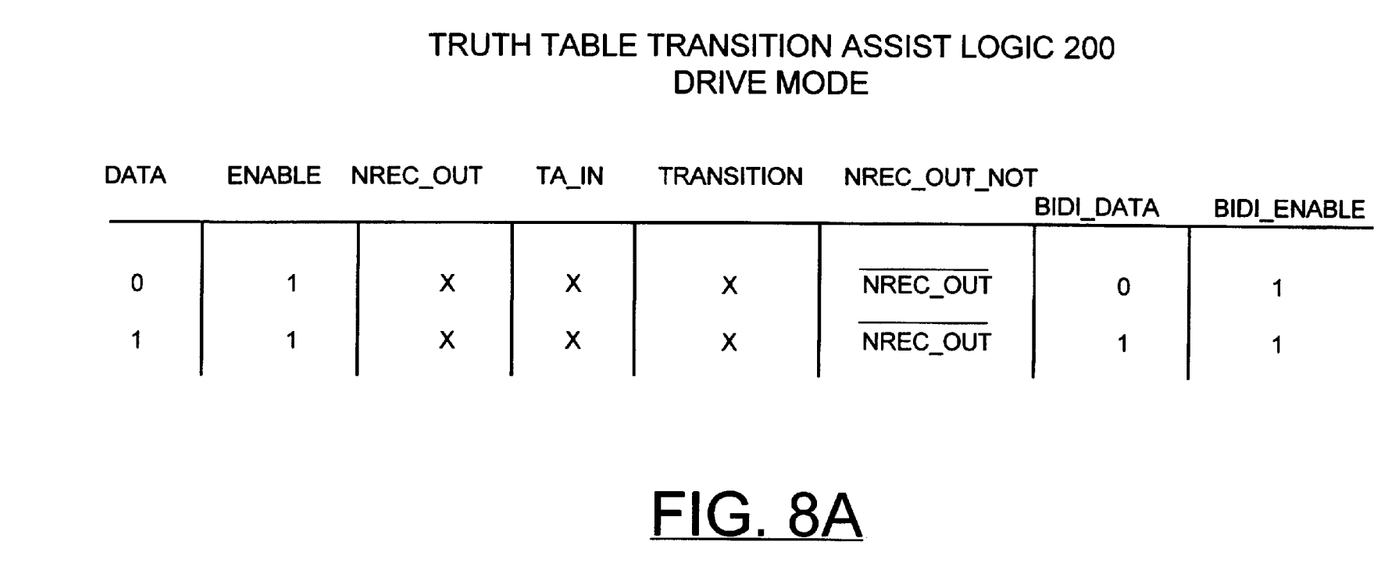
FIGS. 8A, 8B, and 8C are truth tables for a drive mode, a transition assist mode, and a receive mode of the transition assist logic circuit of FIG. 3.
Figure 8B:
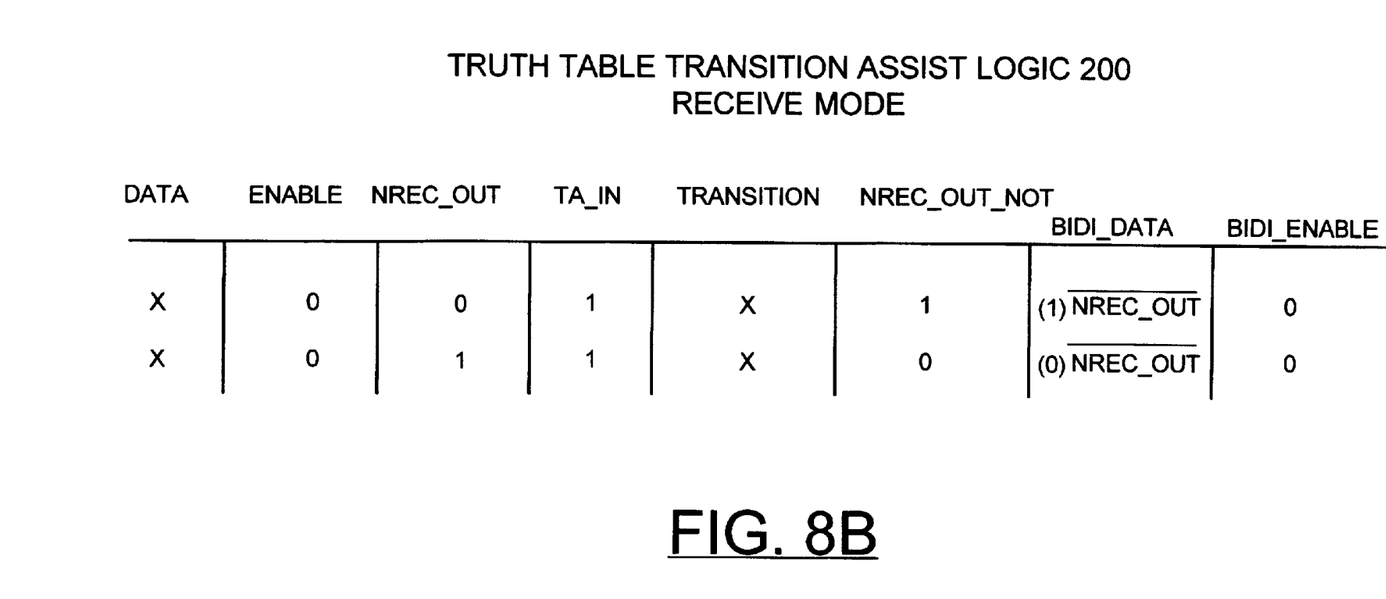
Figure 8C:
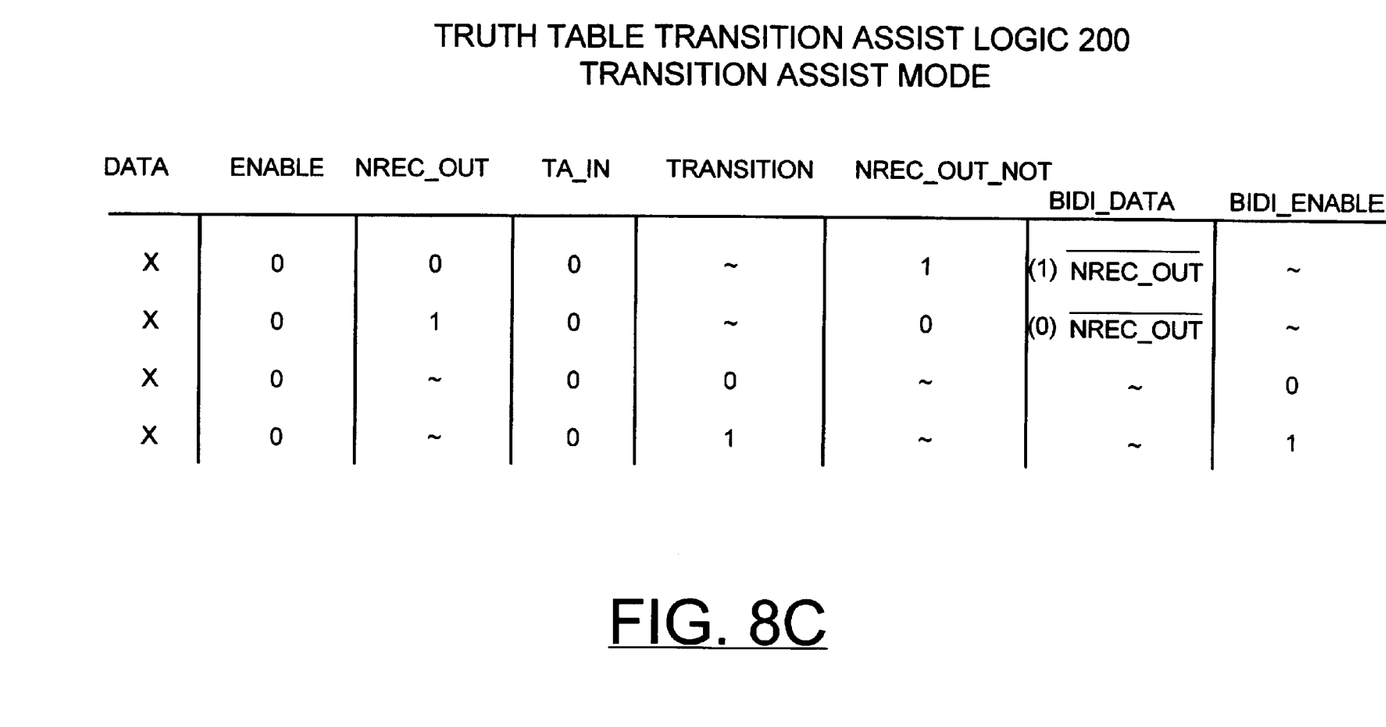

The transition assist logic circuit 200 has modes of operation including the drive mode, TA mode and receive mode. In the TA mode and receive mode, the BIDI_DATA output of the transition assist logic 200 must settle before the BIDI_ENABLE output of the transition assist logic 200 becomes active. In the drive mode, BIDI_DATA and BIDI_ENABLE outputs of the transition assist logic 200 must have the same delay. FIGS. 8A, 8B and 8C illustrate respective transition assist logic truth tables for the drive mode, transition assist (TA) mode and receive mode.

In FIG. 4, the sense compare circuit 202 that uses a sample clock and a latch 402 to store the state of the net as the previous state is shown. The NREC_OUT_NOT input is applied to an inverter 410 and an output NET_PREVIOUS_CYCLE signal of latch 402 is applied to a second inverter 412. The NREC_OUT_NOT input, the NET_PREVIOUS_CYCLE_NOT signal of inverter 412, the NET_PREVIOUS_CYCLE signal of latch 402, and the inverted NREC_OUT output of inverter 410 are applied to respective AND gate inputs of a combination logic block 300 of the sense compare circuit 202. An inverted transition signal TRANSITION_NOT is provided at the output of NOR gate 306 of the logic block 300. The inverted transition signal TRANSITION_NOT is inverted by an inverter 414 providing the transition signal TRANSITION output of the sense compare circuit 202. The NET_SAMPLE_CLOCK and TA_signal are applied to a NOR gate 418. The output of NOR gate 418 provides an inverted latch clock input CP to latch 402. The inverted latch clock output of NOR gate 418 is inverted by an inverter 420 and provides a latch clock input CN to latch 402. The latch 402 samples on the rising edge of the inverted latch clock input CP. The latch clock input CN and the inverted latch clock input CP need to be complements.

Figure 5:
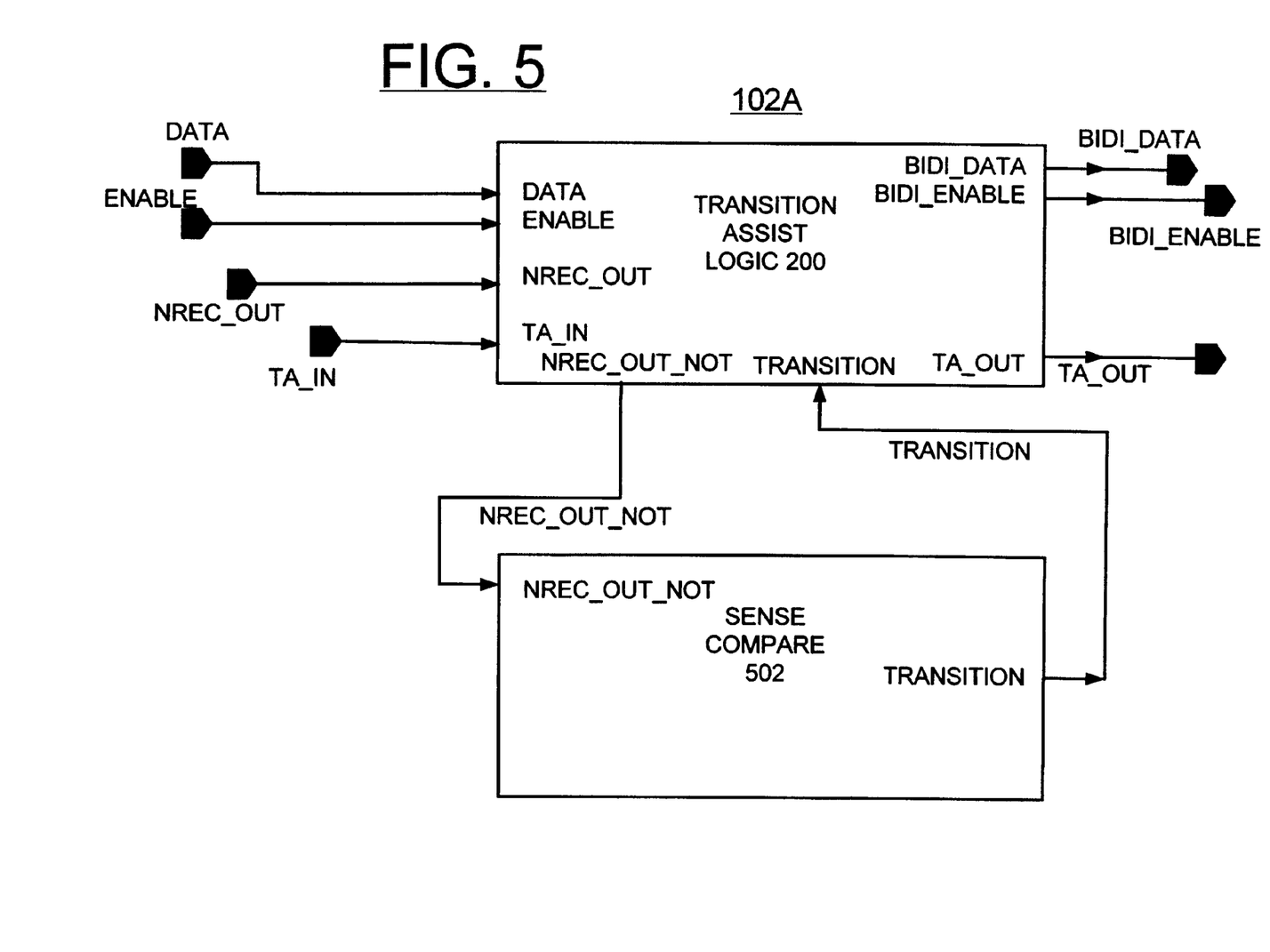
FIG. 5 is a schematic and block diagram representation of an alternative control circuit of the preferred embodiment of the receiver assisted net driver circuit of FIG. 1.
Figure 6:
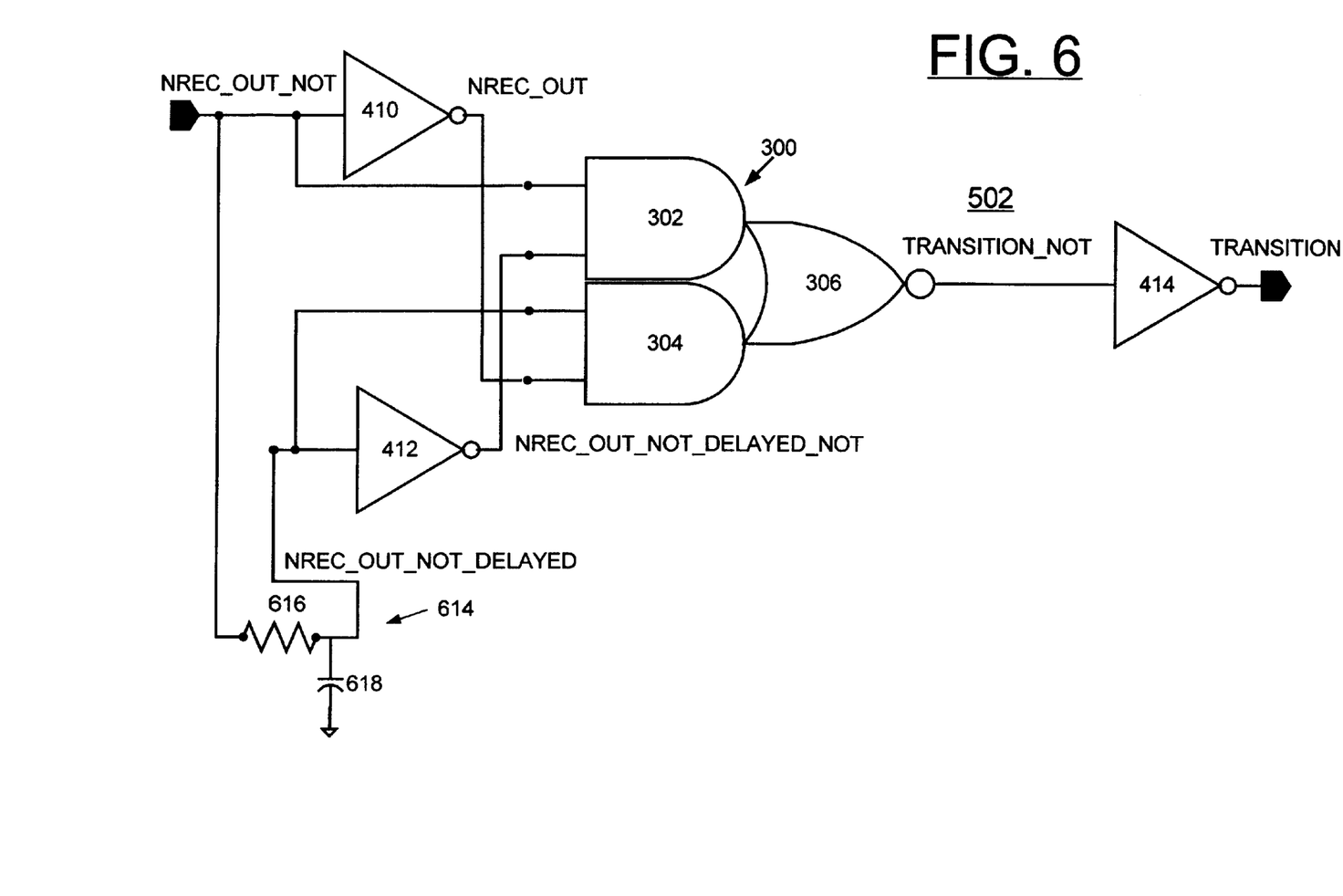
FIG. 6 is a schematic and block diagram representation of a sense compare circuit of the preferred embodiment of the control circuit of FIG. 5.

Referring to FIGS. 5 and 6, control circuit 102A includes the transition assist logic 200 and a sense compare circuit 502 that uses an RC filter to delay the state of the net for the previous state. FIG. 6 illustrates an RC delaying control circuit 102A including a RC filter 614 formed by a resistor 616 and capacitor 618 coupled between the NREC_OUT_NOT input and ground. The same reference numbers used in sense compare circuit 202 are used for similar or identical components of the sense compare circuit 502. Sense compare circuit 502 similarly includes a pair of inverters 410 providing outputs NREC_OUT_NOT_DELAYED_NOT and NREC_OUT applied to respective AND gates 302 and 304 of logic block 300. The NREC_OUT_NOT_DELAYED output of RC filter 614 and the NREC_OUT_NOT input are applied to respective AND gates 302 and 304 of logic block 300. The TRANSITION_NOT output of NOR gate 306 is inverted by inverter 414 to provide the TRANSITION output of sense compare circuit 502.

Figure 7:
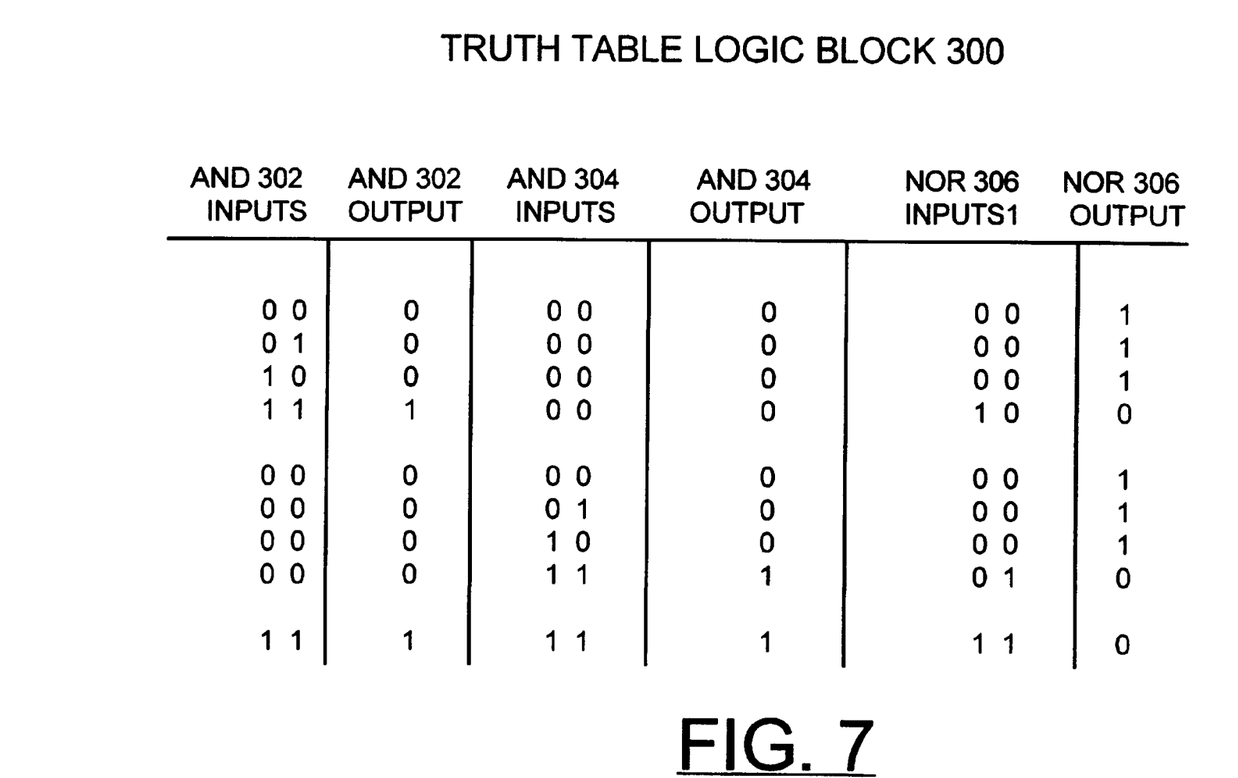
FIG. 7 is a truth table for a logic block of the preferred embodiment included in the transition assist logic circuit of FIG. 3 and the sense compare circuits of FIGS. 4 and 5.

Referring now to FIG. 7 and the following Truth Table, two inputs for AND gates 302 and 304 and NOR gate 306 of logic block 300 are shown.

| a0 | a1 | A | B0 | b1 | B | A | B | C |
|----|----|----|----|----|----|----|----|----|
| 0 | 0 | 0 | 0 | 0 | 0 | 0 | 0 | 1 |
| 0 | 1 | 0 | 0 | 0 | 0 | 0 | 0 | 1 |
| 1 | 0 | 0 | 0 | 0 | 0 | 0 | 0 | 1 |
| 1 | 1 | 1 | 0 | 0 | 0 | 1 | 0 | 0 |
| 0 | 0 | 0 | 0 | 0 | 0 | 0 | 0 | 1 |
| 0 | 0 | 0 | 0 | 1 | 0 | 0 | 0 | 1 |
| 0 | 0 | 0 | 1 | 0 | 0 | 0 | 0 | 1 |
| 0 | 0 | 0 | 1 | 1 | 1 | 0 | 1 | 0 |
| 1 | 1 | 1 | 1 | 1 | 1 | 1 | 1 | 0 |

Referring to FIGS. 8A, 8B, 8C, and 9, truth tables for transition assist logic 200 and the bi-directional I/O circuit 104 are shown. In the drive mode shown in FIG. 8A, a driver 902 in the bi-directional I/O circuit 104 is controlling the state of the net. The ENABLE=1 sets the drive mode of the transition assist logic 200. The following truth table illustrates the drive mode:

| DATA | ENABLE | NREC_OUT | TA_IN | NREC_OUT_NOT | TRANSITION |
|---|---|---|---|---|---|
| 0 | 1 | X | X | NREC OUT NOT | X |
| 1 | 1 | X | X | NREC OUT NOT | X |

| BIDI_DATA | BIDI_ENABLE |
|---|---|
| 0 | 1 |
| 1 | 1 |

The following truth table and FIG. 8B illustrate the receive mode of the transition assist logic 200. The driver 902 is turned off and the transition assist is disabled. The ENABLE=0 and TA_IN=1 sets the receive mode.

| DATA | ENABLE | NREC_OUT | TA_IN | NREC_OUT_NOT | TRANSITION |
|---|---|---|---|---|---|
| X | 0 | 0 | 1 | 1 | X |
| X | 0 | 1 | 1 | 0 | X |

Data is unimportant and BIDI-DATA is unimportant because BIDI_ENABLE=0.

| BIDI_DATA | BIDI_ENABLE |
|---|---|
| (1)NREC_OUT NOT | 0 |
| (0)NREC_OUT NOT | 0 |

FIG. 8C and the following truth table illustrate the TA mode of the transition assist logic 200. The driver 902 is controlled by the control circuit 102, 102A. An output (NREC_OUT) of a receiver 904 is used by the control circuit 102, 102A to determine how to control the driver. NREC_OUT controls BIDI_DATA; transition controls BIDI_ENABLE.

| DATA | ENABLE | NREC_OUT | TA_IN | NREC_OUT_NOT | TRANSITION |
|---|---|---|---|---|---|
| X | 0 | 0 | 0 | 1 | ~ |
| X | 0 | 1 | 0 | 0 | ~ |
| X | 0 | ~ | 0 | ~ | 0 |
| X | 0 | ~ | 0 | ~ | 1 |

| BIDI_ENDATA | BIDI_ENABLE |
|---|---|
| (1)NREC_OUT NOT | ~ |
| (0)NREC_OUT NOT | ~ |
| ~ | 0 |
| ~ | 1 |

ENABLE=0 and TA_IN=0 sets the TA mode. With BIDI_ENABLE=0, no transition on C4 detected so the driver is tri-stated and does not influence the voltage on the C4. When BIDI_ENABLE=1, with a voltage transition on the net detected so the driver is enabled, the data that the driver drives onto the changing net is set by the value of NREC_OUT.

Figure 9B:
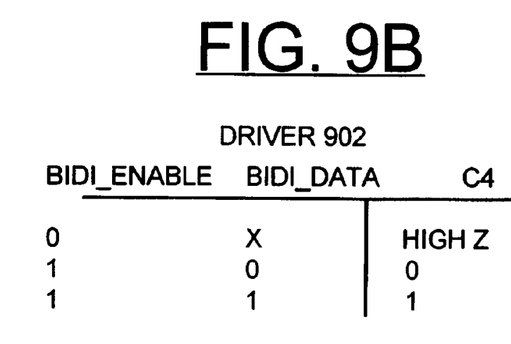
FIGS. 9B and 9C are respective truth tables for a driver portion and a receiver portion of the bi-directional input/output (I/O) circuit of FIG. 9A.
Figure 9C:
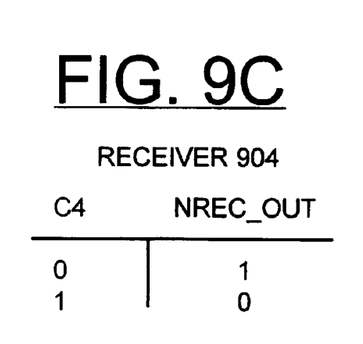
Figure 10:
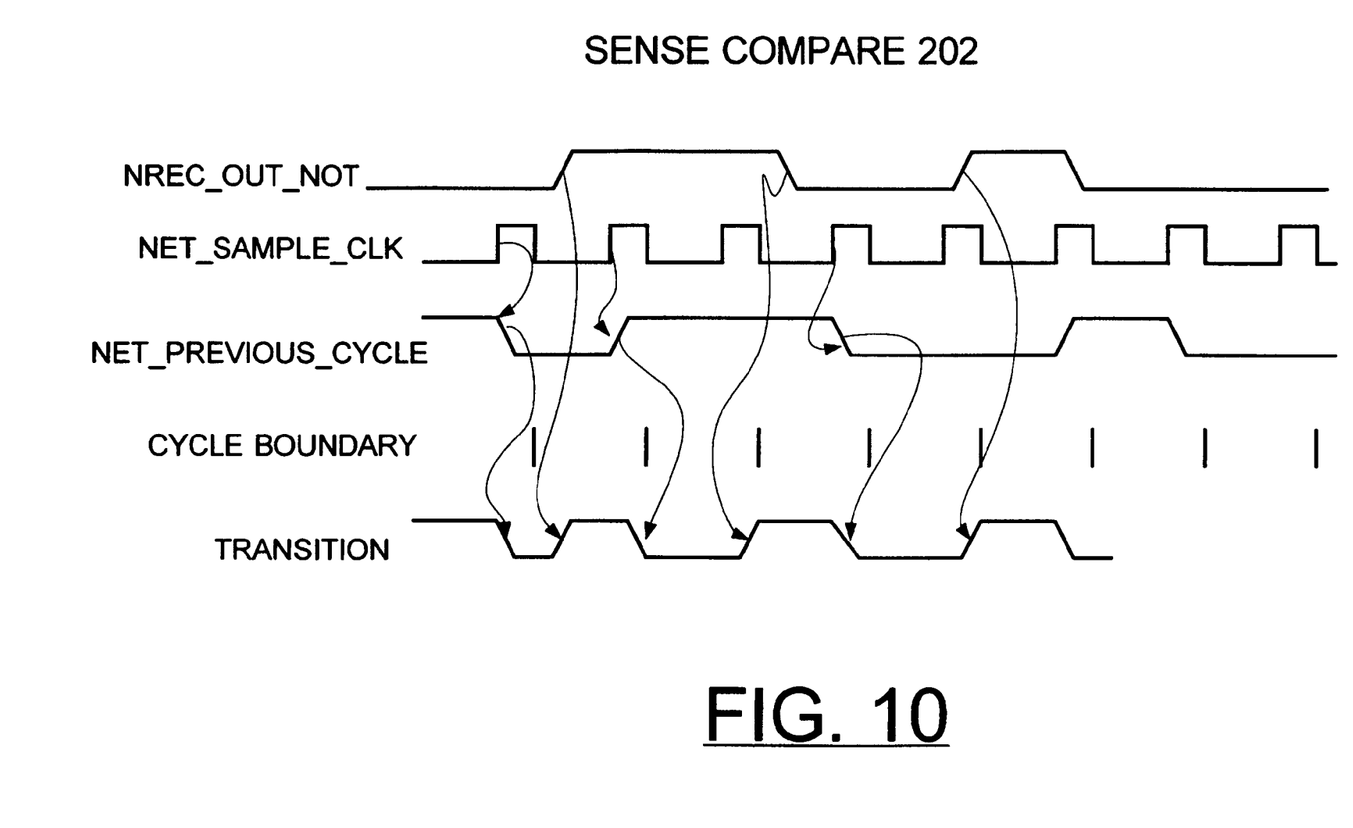
FIG. 10 is a timing diagram for the sense compare circuit of the preferred embodiment of FIG. 4.
Figure 11:
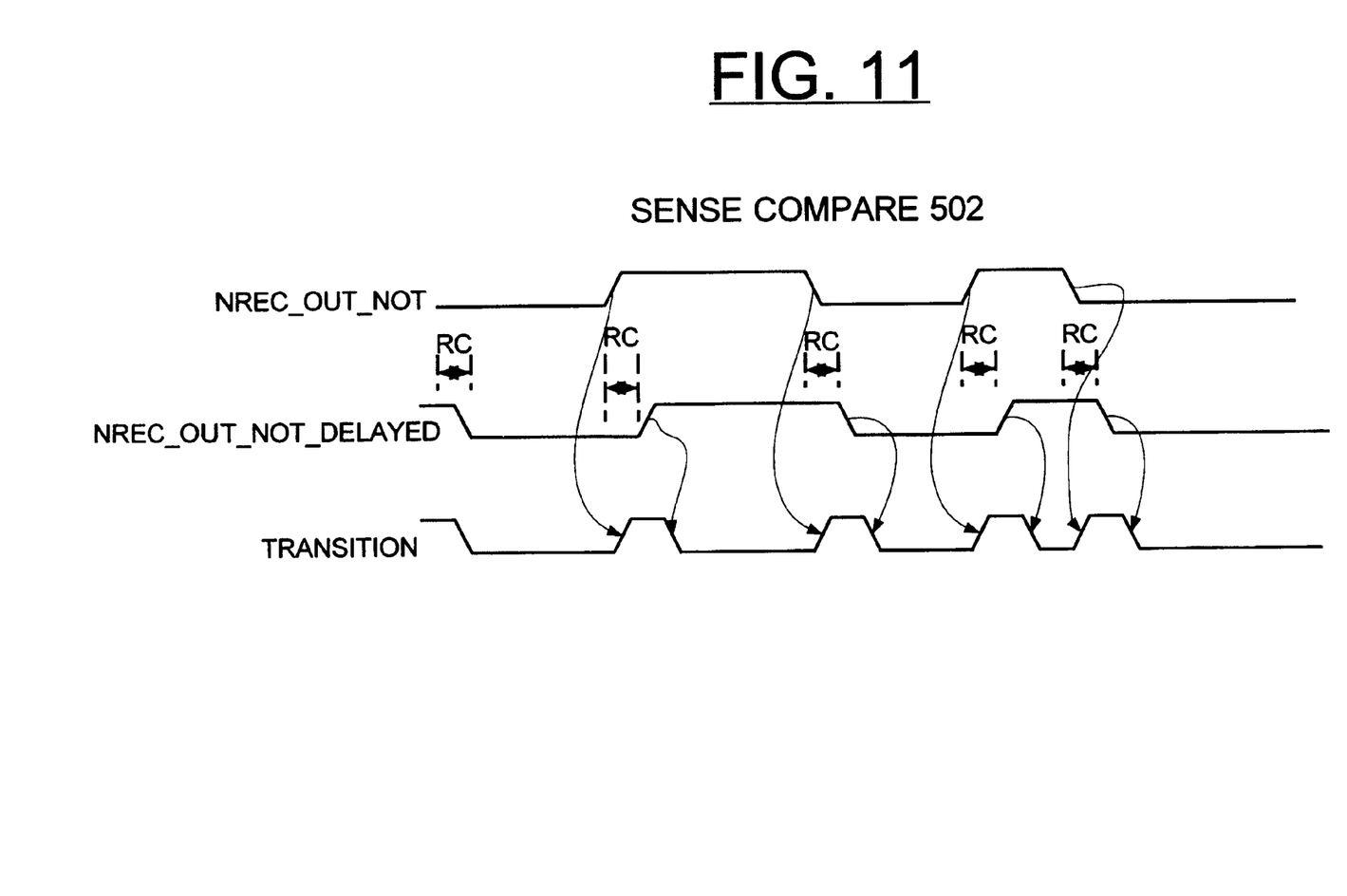
FIG. 11 is a timing diagram for the sense compare circuit of the preferred embodiment of FIG. 6.

Referring to FIGS. 9A, 9B, and 9C, truth tables are shown for the bi-directional I/O circuit 104 including the driver 902 and receiver 904 combination, as follows. As shown in the following truth table and in FIG. 9A, the driver 902 receives the BIDI_ENABLE and BIDI_DATA inputs and provides an output C4 applied to the receiver 904.

| BIDI_ENABLE | BIDI_DATA | C4 |
|---|---|---|
| 0 | X | HI Z |
| 1 | 0 | 0 |
| 1 | 1 | 1 |

With the high impedance output, C4=HI Z, the enable input turns off the driver 902 and the value of data is not important. Driver 902 is tri-stated and does not control the voltage on the net other drivers on other chips attached to this net may control the voltage or the net may be completely uncontrolled. For the zero and one outputs C4=0,1, the enable input is high. During these states, the driver 902 controls the voltage on the net.

| C4 | NREC_OUT |
|---|---|
| 0 | 1 |
| 1 | 0 |

Even when the net is not controlled by any driver it has a voltage value. The output receiver 904 is 1 if the C4 voltage is less than the receiver threshold voltage. The receiver output is 0 if the C4 voltage is greater than threshold voltage.

While the present invention has been described with reference to the details of the embodiments of the invention shown in the drawings, these details are not intended to limit the scope of the invention as claimed in the appended claims.

What is claimed is:

1. A net driver circuit comprising:
   a control circuit,
   a bi-directional input/output (I/O) circuit coupled to said control circuit; said bi-directional input/output (I/O) circuit including a receiver and a driver;
   said control circuit monitoring and identifying state of an input signal to the net, and responsive to a new changed state of said input signal to the net being identified, said control circuit enabling said driver to drive said input signal to the net to said new changed state; and responsive to an unchanged state of said input signal to the net being identified, said control circuit enabling said driver to a high impedance drive state.

2. The net driver circuit as recited in claim 1, wherein said receiver senses a current state of said input signal to the net and said control circuit remembers the previous state of said input signal to the net.

3. The net driver circuit as recited in claim 1, wherein said control circuit includes a transition assist logic circuit and a sense compare circuit; said transition assist logic circuit having a drive mode of operation, a transition assist mode of operation, and a receive mode of operation.

4. The net driver circuit as recited in claim 3, wherein said sense compare circuit detects a transition of said input signal on the net and applies a transition signal to said transition assist logic circuit.

5. The net driver circuit as recited in claim 4, wherein said sense compare circuit uses a sample net clock and a latch to store a previous state of said input signal to the net.

6. The net driver circuit as recited in claim 4, wherein said sense compare circuit uses a time delay filter to provide a time delayed state of said input signal to the net.

7. The net driver circuit as recited in claim 6, wherein said time delay filter comprises a resistor and capacitor combination.

8. The net driver circuit as recited in claim 3, wherein said transition assist logic circuit includes a pair of logic blocks used to provide a data input and an enable input to said bi-directional input/output (I/O) circuit.

9. A control circuit for driving a net comprising:

a transition assist logic circuit, a sense compare circuit coupled to said transition assist logic circuit, said sense compare circuit providing a transition signal;

a bi-directional input/output (I/O) circuit coupled to said transition assist logic circuit; said bi-directional input/output (I/O) circuit including a receiver and a driver;

said transition assist logic circuit monitoring and identifying state of an input signal to the net, and responsive to a new changed state of said input signal to the net being identified, said transition assist logic circuit enabling said driver to drive said input signal to the net to said new changed state; and responsive to an unchanged state of said input signal to the net being identified, said transition assist logic circuit enabling said driver to a high impedance drive state.

10. A net driver circuit comprising:

a control circuit, said control circuit including a transition assist logic circuit and a sense compare circuit;

a bi-directional input/output (I/O) circuit coupled to said control circuit; said bi-directional input/output (I/O) circuit including a receiver and a driver;

said transition assist logic circuit includes a pair of logic blocks used to provide a data input and an enable input to said bi-directional input/output (I/O) circuit; and wherein one of said pair of logic blocks includes a pair of AND gates connected to a two input NOR gate;

said control circuit monitoring and identifying state of an input signal to the net, and responsive to a new changed state of said input signal to the net being identified, said control circuit enabling said driver to drive said input signal to the net to said new changed state.

11. The net driver circuit as recited in claim 10, wherein a data signal and an enable signal are applied to inputs of one of said pair of AND gates and an inverted enable signal and an inverted receiver output signal are applied to inputs of a second of said pair of AND gates.

* * * * *